(12) United States Patent
Kleppe et al.

(10) Patent No.: US 9,645,375 B2
(45) Date of Patent: May 9, 2017

(54) LIGHT MICROSCOPE AND MICROSCOPY METHOD

(71) Applicant: Carl Zeiss Microscopy GmbH, Jena (DE)

(72) Inventors: Ingo Kleppe, Jena (DE); Christoph Nieten, Jena (DE); Yauheni Novikau, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 243 days.

(21) Appl. No.: 13/998,524

(22) Filed: Nov. 7, 2013

(65) Prior Publication Data

US 2014/0146376 A1  May 29, 2014

Related U.S. Application Data

(60) Provisional application No. 61/729,788, filed on Nov. 26, 2012.

(30) Foreign Application Priority Data

Nov. 7, 2012 (DE) .......... 10 2012 022 430
Nov. 23, 2012 (DE) .......... 10 2012 023 024

(51) Int. Cl.
*G02B 21/00* (2006.01)
*G02B 27/58* (2006.01)

(52) U.S. Cl.
CPC ....... *G02B 21/0048* (2013.01); *G02B 21/008* (2013.01); *G02B 21/0072* (2013.01); *G02B 27/58* (2013.01)

(58) Field of Classification Search
None
See application file for complete search history.

(56) References Cited

U.S. PATENT DOCUMENTS

2006/0086887 A1  4/2006  Nakata et al.
2009/0009832 A1*  1/2009  Yamazaki ............ G02B 26/101
                                                    358/510

(Continued)

FOREIGN PATENT DOCUMENTS

DE       10344410 A1      4/2005
DE    102011077269 A1    12/2012
EP        2317362 A1      5/2011

OTHER PUBLICATIONS

Application No. PCT/EP2013/003338, Search Report, Feb. 2, 2014, 2 pages.

(Continued)

*Primary Examiner* — Jennifer L. Doak
(74) *Attorney, Agent, or Firm* — Hoffman Warnick LLC

(57) ABSTRACT

A light microscope having a specimen plane, in which a specimen to be examined is positioned, having a light source to emit illuminating light, having optical imaging means to convey the illuminating light into the specimen plane, having a first scanning means, with which an optical path of the illuminating light and the specimen can be moved relative to each other to produce an illumination scanning movement of the illuminating light relative to the specimen, having a detector means to detect specimen light coming from the specimen and having electronic means to produce an image of the specimen based on the specimen light detected by the detector means at different specimen regions. A second scanning means is present, with which it can be adjusted which specimen region can be imaged on a determined detector element.

15 Claims, 6 Drawing Sheets

(56) References Cited

U.S. PATENT DOCUMENTS

2011/0242649 A1* 10/2011 Murayama ............ G02B 21/06
                                                      359/389
2012/0188359 A1*  7/2012 Karube ................ G02B 21/244
                                                      348/79
2014/0146376 A1*  5/2014 Kleppe .............. G02B 21/0048
                                                      359/212.1

OTHER PUBLICATIONS

International Preliminary Report on Patentability for International Application No. PCT/EP2013/003338, mailed Nov. 7, 2012, 10 pgs.
Sheppard: "Super-Resolution in Confocal Imaging" Jan. 5, 1988, 2 pgs.
Heintzmann, R. et al.; "Laterally Modulated Excitation Microscopy: Improvement of resolution by using a diffraction grating"; Part of the EUROPTO Conference on Optical Microscopy; Stockholm, Sweden; Sep. 1998; SPIE; vol. 3568; pp. 185-196.
Muller, Claus B. et al.; "Image Scanning Mircorscopy"; Selected for a Viewpoint in Physics; Physical Review Letters; May 14, 2010; Published May 10, 2010; Copyright 2010 The American Physical Society; pp. 198101-1 to 198101-4.
Grochmalicki, J. et al.; "Superresolving masks for incoherent scanning microscopy"; J. Opt. Soc. Am. A; vol. 10; No. 5; May 1993; pp. 1074-1077.
Shoa, Lin et al.; Super-resolution 3D microscopy of live whole cells using structured illumination; Nature Methods; Brief Communications; vol. 8; No. 12; Dec. 2011; Copyright 2011 Nature America, Inc.; pp. 1044-1048.
Bertero, M et al.; "Super-resolution in confocal scanning microscopy"; Inverse Problems 2; IOPScience; 1987; pp. 19.
Shao, Lin et al.; "Super-resolution 3D microscopy of live whole cells using structured illumination"; Nature Methods; pp. 13.
Tanaami, Takeo et al.; "High-speed 1-frame/ms scanning confocal mircoscope with a microlens and Nipkow disks"; Applied Optics; vol. 41; No. 22; Aug. 1, 2002; pp. 4704-4708.

* cited by examiner

LIGHT MICROSCOPE AND MICROSCOPY METHOD

The present invention relates to a light microscope according to the preamble of claim 1. In addition the invention is based upon a microscopy method according to the preamble of claim 14 which can also be described as a method for recording images in a light microscope.

The purpose of a generic light microscope is to record images of a specimen located in the specimen plane and illuminated by light from at least one light source. The light coming from the specimen is recorded with a detection means to generate the specimen image.

For this purpose a generic light microscope has a specimen plane, in which a specimen to be examined can be positioned, a light source to emit illuminating light, optical imaging means to convey the illuminating light into the specimen plane, a first scanning means, with which an optical path of the illuminating light and the specimen can be moved relative to each other to produce an illumination scanning movement of the illuminating light relative to the specimen, a detector means to detect specimen light coming from the specimen, and electronic means to generate an image of the specimen on the basis of the specimen light detected by the detector means at different regions of the specimen. Optical means can usefully be provided to form an image of different regions of the specimen on different regions of the detector means.

According to a generic microscopy method for examining a specimen positioned in a specimen plane of a microscope it is provided that illuminating light is conveyed into the specimen plane, that an optical path of the illuminating light and the specimen are moved relative to each other to produce an illumination scanning movement of the illuminating light relative to the specimen and that specimen light coming from the specimen is detected with a detector means. Different specimen regions can thereby be imaged on different detector regions of the detector means. Finally, an image of the specimen on the basis of the detected specimen light is produced with electronic means.

It is a fundamental aim with such light microscopes and microscopy methods to produce a specimen image with the highest resolution possible and a good signal-to-noise ratio.

In order to examine a specimen with increased resolution, it is well established to use structured illumination microscopy (SIM). The illuminating light is thereby conveyed as structured illuminating light into the specimen plane. In general, however, an illumination spot or a arbitrarily formed illumination pattern can be produced in the specimen plane. Structured illuminating light can be understood to be any light with a spatially variable intensity distribution over the beam cross-section. This includes light with a periodic intensity distribution over the cross-section, e.g. a one-dimensional line pattern with illuminated and non-illuminated lines.

If a light microscope of the abovementioned type is formed as a laser scanning microscope, an illumination spot or dot is produced as an illumination pattern. This can be virtually diffraction-limited and can also be regarded in the present disclosure as a form of structured illuminating light.

In order to generate structured illuminating light, optical components providing structured illuminating light are usually incorporated into the optical path of the light microscope between the specimen and the light source. In general, a plurality of optical components is used to achieve the necessary flexibility in the structured illuminating light.

The optical components are frequently lattices. Use is thereby made of lattices with different lattice arrangements and period during a generally sequential specimen image recording. According to a subsequent processing of the image data, an image of the specimen is produced with increased resolution. Increased resolution is intended to mean in comparison with wide field resolution.

The increased resolution which can be achieved with this method constitutes a considerable advantage in relation to the conventional recording of wide field images but also in relation to laser scanning microscope images.

The previously described variant of structured illumination in the form of an illumination spot is used in a laser scanning microscope. In this form of light microscope the increased resolution is achieved by a so-called pinhole being positioned upstream of the detector. The pinhole has a size which is clearly smaller than the diffraction limit, for example smaller than or equal to ¼ airy unit (AU). This is called a confocal laser scanning microscope (LSM). With LSM, good confocality is produced through the pinhole spatial filtering.

The airy unit is defined via the first zero points of a diffraction-limited illumination spot and is an established term in optical literature. An airy is thus an extension of a diffraction disk in an image plane, wherein the diffraction disk is caused through a point in the specimen plane. The extension can be defined as a section between the first zero points of the diffraction disk.

The poor signal-to-noise ratio constitutes a significant disadvantage of a laser scanning microscope in the present method for achieving increased resolution. This results from the low number of detected photons coming from the specimen. This leads in practice to improved resolution not being possible.

A method for increasing the resolution in a laser scanning microscope goes back to the article "Super-resolution in Confocal Imaging" by Colin Sheppard et al., which appeared in "Optik 80", No. 2, 53 (1988). The resolution of a laser scanning microscope is hereby increased with simultaneously better signal-to-noise ratio. In this connection a larger pinhole diameter of approximately 1 airy unit is used. This leads to a higher number of detectable photons. In addition, use is made of a sub-airy spatially resolved detection. After recording of the image, sorting and calculation of the data are carried out by means of a special algorithm. This leads to an increased resolution in the specimen image.

A closer explanation of this method is given by reference to FIG. 1. This shows, schematically, a specimen along the X axis of a specimen plane. The specimen comprises a fluorescent object 42. In addition an illumination spot 44 is shown. On the Y axis, the intensity I of the illumination spot 44 is indicated. The dimensions of the illumination spot 44 can be diffraction-limited and are greater in the X direction than the object 42. If the illumination spot 44 comes into contact with the object 42, the object 42 is stimulated to fluoresce and emits specimen light which can be detected by a detector means.

FIG. 1 further shows an image of such a detector means 60 in the specimen plane. The detector means 60 comprises a plurality of detector elements 61. If the specimen plane is completely illuminated, specimen light from the object 42 is accordingly measured mainly by the detector element 61A.

However, the detector elements 61 do not only receive specimen light coming from a point of the specimen plane. Instead an extended receiving region is imaged on each detector element, said receiving region being determined by the PSF (Point Spread Function) of the image. The PSF for a detector element 61 can for example be in the form of the indicated illumination spot and is centred around the corresponding detector element 61. The dimensions of the illumination spot 44 can also be determined by a PSF of a point light source.

The measured light intensity of a certain detector element is determined by a total PSF which is the product of the PSF relative to the illumination spot 44 and the PSF relative to the detector element. The maximum of the total PSF can lie approximately centrally between the illumination spot 44 and the respective detector element. In the embodiment shown, the illumination spot 44 is centred around a position 44D. The detector element 61D receives light in this case mainly from a location which lies centrally between 44D and 61D.

This is the position 61A, at which the object 42 is located. On the other hand the detector element 61D measures hardly any light from the position 61D.

In order to scan the specimen, the illumination spot is displaced from 44D to for example the position 44B. The detector element 61D then no longer measures light mainly from the position 61A, but instead from 61B.

This factor can be used to increase resolution. In this connection the detector elements 61 are read at each position of the illumination spot 44. The specimen light signals thereby measured are assigned, in dependence upon the position of the illumination spot 44, to different specimen regions. This means that the specimen light signals measured by one and the same detector element are sorted in dependence upon the position of the illumination spot 44.

The sorting is illustrated through the curved arrows. Accordingly a signal of the detector element 61D is assigned to the location of the object 42 if an illumination spot is at the point 44D. Similarly, a signal of the detector element 61C is assigned to the location of the object 42 when an illumination spot is at the point 44C and a signal of the detector element 61 B is assigned to the location of the object 42 when an illumination spot is at the point 44B.

In this way it is indeed possible to achieve an improvement in resolution. However, a high level of apparatus is required to achieve this sorting. In addition the time required to calculate the sorting is comparatively great.

The use of time is particularly high if sensitive wide field detectors, such as for example CCD chips, are used. The comparatively low read speed thereof increases the time required to examine the specimen.

It can be regarded as an object of the invention to provide a light microscope and a microscopy method, wherein the greatest possible measurement resolution with short measurement times is facilitated in a cost-effective way.

The object is achieved through a light microscope having the features of claim 1 and a microscopy method having the features of claim 14.

Preferred embodiments of the method according to the invention and the light microscope according to the invention are the subject matter of the dependent claims and are explained in the following description, in particular in connection with the drawings.

The light microscope of the abovementioned type is characterised according to the invention in that a second scanning means is present, with which it is possible to adjust which specimen region can be imaged on a certain detector element, to produce a detection scanning movement of a receiving region of a detector element in the specimen plane relative to the specimen, and in that the electronic means is adapted to control the first and the second scanning means in dependence upon each other and in such a way that a momentary direction of the detection scanning movement is counter to a momentary direction of the illumination scanning movement.

The microscopy method of the aforementioned type is characterised according to the invention by a detection scanning movement of a receiving region of a detector element being produced in the specimen plane relative to the specimen insofar as it is adjusted which specimen region is imaged on a certain detector element, and in that the illumination scanning movement and the detection scanning movement are controlled in dependence upon each other and in such a way that a momentary direction of the detection scanning movement and a momentary direction of the illumination scanning movement are counter, i.e. opposite, to each other. The microscopy method according to the invention is preferably carried out with a microscope according to the invention.

A core idea of the invention can be regarded as not maintaining a fixed position of a specimen image on the detector means during the illumination scanning movement. Instead, a detection scanning movement is carried out with the second scanning means, that is to say a relative movement between the detector means and the imaging of a specimen region on the detector means. For this relative movement, in principle, a movement of the specimen, of the detector means or imaging means which produces the image of the specimen on the detector means can take place.

The specimen region from which a certain detector region mainly receives light depends upon the position of the illumination pattern or illumination spot on the specimen. This was explained in greater detail by reference to FIG. 1. Through the illumination scanning movement the illumination pattern is displaced on the specimen. The specimen region from which a certain detector element mainly receives light is also thereby displaced.

By way of an essential advantage it can be ensured through the detection scanning movement that a certain detector element mainly receives light constantly from the same specimen region. For this purpose the detection scanning movement is carried out simultaneously with the illumination scanning movement.

In addition the direction of the detection scanning movement is significant. In general, initially the illumination pattern is irradiated on a first specimen region and a third specimen region is imaged on a certain detector element. The first and third specimen region can thereby differ from each other, overlap or be identical. Through the illumination scanning movement the illumination pattern is now moved from the first specimen region to a second specimen region. On the basis of the detection scanning movement, a fourth specimen region is imaged on the aforementioned detector element. According to the invention a direction from the third to the fourth specimen region is counter to a direction from the first to the second specimen region.

As explained by reference to FIG. 1, the light intensity received by the certain detector element depends not only upon the receiving region thereof, that is to say which specimen region is imaged on the detector element. Instead, the light intensity also depends upon the position of the illumination specimen. The total PSF, with which a detector element receives light, is dependent upon the PSF of the illumination and the PSF between the image plane and the detector. Through the opposing direction of the detection scanning movement it can be ensured that the position of the total PSF for a certain detector element remains relative to the specimen. Accordingly, the detector element receives light constantly from the same specimen region.

A particular advantage is hereby that it is no longer necessary to assign measurement signals of one and the same detector element in dependence upon the position of the illumination pattern to different specimen regions. The apparatus requirements and time required to record a specimen image are thereby reduced.

A further essential advantage of the invention is that a single raw image already has an increased resolution with good signal-to-noise ratio, reduced extra-focal specimen light and without necessary calculations.

The light source can in principle be of any type and preferably comprises one or more lasers. The illuminating light can be transmitted for example as an illumination spot into the specimen plane. Other illumination patterns such as for example a lattice pattern or a pattern of a plurality of illumination spots are also possible. Through the illuminating light a specimen can emit light which is described as specimen light. This can be reflected illuminating light or also luminescent light, thus fluorescent or phosphorescent light. The specimen light is detected by the detector means which has a plurality of detector elements arranged one beside the other for a spatial resolution. A detector region can be regarded as a plurality of adjacent detector elements. These can be formed by one or more camera chips. A specimen image can be determined from the detected light signals with the aid of electronic means which can be part of a control unit or control means.

The illumination scanning movement is a relative movement between the illumination pattern in the specimen plane and the specimen. A direction indication of the illumination scanning movement can be determined by the direction in which the illumination pattern moves on the specimen. The illumination scanning movement can thereby take place continuously or discontinuously. In the case of a discontinuous illumination scanning movement, lattices positioned differently one after the other can be imaged in the specimen plane.

The detection scanning movement is a relative movement between the receiving region of a certain detector element in the specimen plane and the specimen. A receiving region is the region in the specimen plane from which an associated detector element receives light. The receiving region is determined by the PSF of the image between the specimen plane and image plane and by the dimensions of the associated detector element. A receiving region can also be interpreted as an image of the associated detector element in the specimen plane. A direction indication of the detection scanning movement can be defined by the direction in which the receiving region of a certain detector element moves relative to the specimen.

The illumination scanning movement and the detection scanning movement are counter to each other when the receiving regions of the detector elements are moved counter to the illumination pattern in the specimen plane.

In the case of continuous illumination and detection scanning movements these take place simultaneously in order to achieve a counter movement relative to each other. The illumination scanning movement can, however, also take place discontinuously. An illumination pattern is thereby produced for a predefined time in the specimen plane. Directly thereafter or after an illumination interruption period, a different or similar illumination pattern is produced at a different point in the specimen plane for a predefined time. In this way, all specimen regions can be scanned one after the other. A detection scanning movement can hereby take place simultaneously with a spatial repositioning of the illumination pattern. Alternatively, however, the detection scanning movement can also take place after a repositioning through the first scanning means so long as the detection scanning movement is carried out during the illumination interruption period.

The progression of the illumination scanning movement can have any given form. In the case of an illumination spot for example a zigzag movement can take place. In the case of lines as illumination patterns which can be produced for example through lattices, the illumination scanning movement can be a straight line movement transversely, particularly perpendicularly, to the line direction. The detection scanning movement is consequently selected corresponding to a momentary direction of the illumination scanning movement and can also have a zigzag form or a straight line progression.

The relative movement through the first scanning means can take place in principle by moving the light source, by changing the path of the illuminating light or by displacing the specimen. Preferably, a beam deflection of the illuminating light can be set with the first scanning means to produce the illumination scanning movement. The time requirement for this is advantageously particularly low. A beam deflection preferably takes place via a scanning mirror which is driven for example by a galvanometer or a microelectromechanical system (MEMS). Alternatively, piezoelectric actuators are also suited for adjustment. Instead of a scanning mirror, the inclination of a light-permeable plate or the position of a refractive wedge can be changed. Furthermore beam deflections can be varied in a short time by acousto-optical devices.

According to a preferred alternative, a specimen holder can be moved relative to an optical path of the illuminating light with the first scanning means to produce the illumination scanning movement. The installation resources required are advantageously low and no intervention in the optical path between the light source and specimen plane is necessary.

The detection scanning movement is in turn a relative movement, for which movement of the specimen relative to the detector, the detector relative to the specimen or an adjustable beam deflection of the specimen light is possible.

A beam deflection of the specimen light can preferably be adjusted with the second scanning means to move an image of a specimen region over the detector means. The beam deflection can thereby take place in one of the ways described for the beam deflection of the illuminating light.

Alternatively, the second scanning means can be adapted to move a specimen holder and/or the detector means in order to move an image of a certain specimen region over the detector means. In the case of a displacement of the detector means the optical path from the light source to the specimen plane can advantageously be uninfluenced by such a movement.

It is particularly preferable if the first and the second scanning means are formed with a joint scanning means. The joint scanning means can have a scanning mirror, wherein illuminating light can be conveyed to a front side of the scanning mirror. In order to produce counter directions between the illumination scanning movement and the detection scanning movement, beam guiding means can be provided, with which the specimen light can be conveyed to a rear side of the scanning mirror. If the scanning mirror is rotated the change in the reflection direction for the front side is opposed to that of the rear side. Less cost-intensive components are hereby advantageously necessary. In addition space-saving embodiments are possible in principle.

In the aforementioned variant, comparatively simple beam guiding is possible if the specimen light can be conveyed with the beam guiding means initially to the front side of the scanning mirror and from there to the rear side of the scanning mirror. In order to produce opposing directions between the illumination scanning movement and the detection scanning movement, specimen light reflected from the rear side of the scanning mirror can be conveyed once again to the rear side of the scanning mirror.

In principle improvements can already be achieved in the image quality as soon as the illumination scanning movement and the detection scanning movement are counter to each other. However, particularly significant improvements are achieved if the electronic means is adapted to carry out the illumination scanning movement and the detection scanning movement with a coinciding step size and/or speed. These are to coincide upon observation in the specimen plane. This means that the movement of the illumination pattern in the specimen plane is to be of equal size or speed to the movement of the receiving region of a detector element in the specimen plane. In the case of a discontinuous illumination the step size describes the offset between two subsequent illumination patterns. In the case of continuous illumination an indication of the illumination change as speed is useful.

If the detector means is moved for a detection scanning movement, the speed or step size thereof is greater by the magnification, with which a specimen region can be imaged on the detector means.

The electronic means can also be adapted to select the step sizes and/or speeds differently from each other and in dependence upon the PSF between the light source and specimen plane and upon the PSF between the specimen plane and detector means.

Through the light microscope according to the invention and the microscopy method according to the invention, a particularly high resolution can be achieved. It is particularly preferred for this purpose that adjacent detector elements should have a distance from each other which is smaller than an airy disk produced by a point in the specimen plane on the detector means. The airy disk can thereby—as previously mentioned—be defined as a section between the first intensity minima of the image of a specimen point in the image plane. The resolution gain through the invention is thus particularly valid if in the specimen plane the receiving regions of at least four detector elements overlap each other. In this case the detector elements can also be described as sub-airy detector elements.

An image of a specimen can be produced with the optical means on a detection surface of the detector means, wherein the dimensions of the image are given through the magnification of the optical means. The image of a specimen is thereby to be understood as an image of the whole region in the specimen plane which can be imaged at a point in time by the optical means. Without detector scanning movement a detection surface would be sufficient which in comparison with the reproducible region of the specimen plane is greater by the magnification between the specimen plane and image plane. Through the detector scanning movement the required detection surface is, however, larger. A length and/or a width of the detection surface can preferably be at least twice the size of the dimensions of the image, that is to say at least twice the size of the specimen region to be examined multiplied by the magnification. Through the double size it is taken into account that the step sizes and/or speeds of the specimen and detector scanning movement are preferably equal in value and are counter to each other.

Particular advantages are achieved if the microscope is a wide field microscope. In this case, it is possible in particular for the whole specimen region to be examined which is illuminated part by part through the illumination scanning movement to constantly be imaged on the detector means.

Alternatively, in an optical detection path, that is to say in an optical path between the specimen plane and the detector means, a diaphragm for confocal or quasi-confocal filtering can be present. For quasi-confocal filtering, the diaphragm can have an opening which has a size of between one and two airy units.

According to a preferred variant of the microscopy method according to the invention illumination scanning movements and detection scanning movements are carried out during an integration time of detector elements of the detector means. In the case of a position change of the illumination pattern and the receiving regions of the detector elements in the specimen plane there is not therefore an interruption in the integration of the detector elements. An interruption can be omitted on the basis of the described counter movements. A measurement of the detector elements is also continued during a position change of the illumination pattern and the receiving regions of the detector elements. The required time and/or the signal-to-noise ratio can hereby be improved.

In order to record a specimen image the detector elements can integrate received specimen light signals continuously. This means that each detector element needs to be read only once in order to produce the specimen image. Considerable simplifications go hand in hand with this in relation to the method described above in relation to FIG. 1, in which for each position of the illumination spot reading of the detector elements is required.

Further advantageous variants of the method according to the invention follow through the operation of the embodiments of the light microscope according to the invention. In addition the electronic means are preferably adapted for automatic execution of the above-described method variants.

The invention can also be described as an image producing method, in which relative movements take place between a structured illumination (spot(s), line(s)) of a specimen and a detection in such a way that a first relative movement takes place between the structured illumination and the specimen and a second relative movement takes place between the detection and the specimen, wherein the first relative movement takes place simultaneously with and preferably counter to the second relative movement.

It can thus be provided that a first relative movement of the illumination spot relative to the specimen and a second relative movement of the detection means consisting of sub-airy detector elements relative to the specimen take place in such a way that the first relative movement and the second relative movement occur counter to each other and simultaneously with each other (see in particular FIG. 2).

The relative movement allows, according to an embodiment of the method, the specimen to move in the specimen plane of the light microscope as well as the illumination spot. The movement of the specimen thereby takes place in the same direction as that of the illumination spot in the specimen plane, but preferably only with half the step size and/or half the speed of the illumination spot in the specimen plane during the movement. The detection means and the image thereof in the specimen plane preferably do not move in this embodiment.

It is thus provided here that the detection means remains in a specimen plane, a movement of the specimen and the structured illumination takes place, wherein the specimen in a specimen plane constantly moves in the same direction as the structured illumination in a specimen plane. The specimen preferably moves with half the step size and/or half the speed or the step size and/or the speed of the structured illumination.

According to a further embodiment of the method the illumination spot remains in the specimen plane and the specimen and the detection means or the image thereof move in the specimen plane. The movement of the specimen thereby takes place in the same direction as that of the image of the detection means in the specimen plane, but preferably only with half the step size and/or half the speed of the image of the detection means in the specimen plane during the movement.

It is consequently provided in this embodiment that the structured illumination remains in a specimen plane and that a movement of the specimen and the detection takes place. The specimen thereby moves constantly in the same direction as the detection means in a specimen plane, that is to say like an image of the detection means in the specimen plane. The specimen preferably moves with half the step size and/or half the speed or the step size and/or speed of the image of the detector or detection means in the specimen plane.

According to a technically preferred embodiment of the method the specimen remains in the specimen plane of the light microscope and the detection means or the image thereof in the specimen plane moves in the opposing direction with preferably equal step size and/or equal speed to that/those with which the illumination spot moves in the specimen plane. If the detection means moves itself it actually moves by a distance to scale with the magnification of the specimen plane in the detection plane.

Accordingly it is provided in particular that the specimen remains in a specimen plane and a movement of the detection and the structured illumination takes place. It is preferable that the image of the detection means in a specimen plane carries out a movement constantly counter to, and simultaneous with, the structured illumination in a specimen plane, the step size and/or speed being preferably equal in value.

The diametral, that is to say opposing, movement of the detection means or the image thereof in the specimen plane relative to the structured illumination can be carried out by the detection means itself moving (already mentioned).

Alternatively, a further 1D or 2D scanning means can be provided. The diametral relative movement of the detection means or of the image thereof in the specimen plane relative to the structured illumination can be carried out by a further galvanometer and/or MEMS scanning means in the optical detection path.

In addition a plane-parallel (glass) plate which can be tilted around at least one axis or at least one displaceable wedge-shaped (glass) substrate can additionally be introduced into the optical detection path after the colour splitting through a colour beam splitter upstream of the detection means.

It can accordingly be provided that the diametral movement of the detection means or the image thereof in the specimen plane relative to the structured illumination is carried out through a plane-parallel glass plate which can be tilted around at least one axis or at least one displaceable wedge-form glass substrate in the optical detection path.

The method works not only with an illumination spot in the conventional sense but it can also provide an improvement in resolution with any type of structured illumination.

Further forms of a structured illumination are for example multi-spot illumination arrangements, a line, multiple line illumination arrangements. In the case of a line illumination there is an improvement in resolution perpendicular to the line. It is, however, also possible to subsequently rotate the line relative to the specimen and thus obtain a resolution improvement in further directions, similarly to structured illumination microscopy (SIM).

A necessary requirement upon a preferred embodiment of the method is that a control unit carries out the synchronisation of the necessary relative movements of the structured illumination, the specimen and the detection means in the manner according to the invention.

The diametral movement of the detection means or the image thereof in the image plane relative to the structured illumination can also be configured according to the invention in that the scanning means which is provided with the reference numeral 20 in the drawings is traversed three times by the specimen light: once before the colour splitting through the colour beam splitter and twice after the colour splitting in the direction of the detection means. The specimen light thereby runs two times more through the scanning means than the illuminating light. As a result the angle change of the optical axis introduced by the scanning means before the colour splitting is not only compensated, as in the case of simple running through of the scanning means, but instead overcompensated. The optical axis is thus not static on the detection means but instead moves over the detection means by half the length, by which the specimen light produced by the illumination spot moves. The aforementioned relative movements required for the method between the specimen, structured illumination and detection means are thus achieved. A second scanning means, identified by the reference numeral 50 in the drawings, can be omitted in this embodiment. A synchronisation of the movement of an additional scanning means is advantageously not thereby required.

If the specimen light runs only once through the scanning means 20 and is subsequently detected, this is called a de-scanning detection. If the specimen light runs once through the scanning means 20 and at least one further scanning means 50, reference is made to a so-called re-scan. If the scanning means 50 is the scanning means 20 the specimen light must run twice via the scanning means 20 after the first passage via the scanning means 20 in order for the method to work.

According to a preferred embodiment the microscope comprises means for a re-scan of the specimen light via the scanning means 20 and/or the second scanning means 50.

A scanning means can also constitute a lattice moved during the detection of the specimen light or the resulting structured line illumination moved in the specimen plane.

The aforementioned embodiments of the relative movement of the detection means according to the invention such as e.g. the plane-parallel plate or the scanning means 50 in the optical detection path can be interpreted as embodiments of the scanning means 50.

According to a particular variant of the method according to the invention the detection means, e.g. a camera chip, is integrated during the whole scanning time or exposure time. Neither an intermediate reading of the detection means or parts thereof, nor the generation of structured illumination patterns are necessary.

A further embodiment of the method according to the invention is thus given in that each specimen point of the specimen assigned to a detector element is located in the middle between the illumination spot and the detector element during the whole scanning of the specimen. The assignment takes place at the start of the scanning process: The specimen point which is assigned to a detector element lies between the illumination spot and the detector element.

The method according to the invention can be used not only in the field of light microscopy. It always provides images with increased resolution if scanning of a specimen is carried out in a structured manner with a probe which has wave properties in an imaging system which is subject to diffraction, and the sub-structure of the specimen response, thus the specimen signal, is detected spatially resolved clearly below the diffraction limit. This means that the method could also be used for example in electron microscopy.

Reference is made to the fact that in material microscopy, in particular in profilometry, the phase function of the specimen is determined. Phase-sensitive detection must therefore be carried out when the method is applied. An interferometric measurement method, for example, is particularly suited for this, which must be integrated into the type of detection required according to the invention. A single implementation of an interferometric measurement method can take place by means of a Mirau objective. The reference wave is produced in the objective itself.

The method described can be particularly advantageously combined with one or more of the following methods for super-resolution:

1. STED/RESOLFT

The PSF manipulation which is applied in methods such as STED (stimulated emission depletion) and RESOLFT (reversible saturable optical fluorescence transitions) in their most varied configurations (g-STED, cw-STED, etc.) can be combined, in case of suitable scanning frequency of the detector (Nyquist for final resolution), directly with the method described without substantial changes. Merely the described relative movement and the synchronisation with the integration time of the detector are correspondingly adapted. This combination is particularly advantageous for the imaging of living cells, since the resolution gain over the method described here is produced extensively without an additional photon budget. Merely the additional dark noise and read noise of the different detector elements would be added to this. In the case of suitable choice of detector this can, however, be greatly reduced for example in the photon-counting mode.

2. SOFI

As described in DE 10 2011 077 269, the content of which is completely incorporated herein by reference thereto, the SR method can be efficiently combined with SOFI (super-resolution optical fluctuation imaging). Here, besides the already discussed advantages, is the added fact that the calculation remains solely SOFI-based. This means that, besides simplicity, the calculating time is significantly reduced.

3. NSIM

The method described here also allows a non-linear mode related to the NSIM, which efficiently makes the structured illumination of higher frequency either by switching colour molecules or saturation of the colour.

In order to increase the image recording speed the method according to the invention can be configured with a multi-spot illumination. It is then to be ensured that the clear assignment between the specimen point and detector element is not lost by a detector element going into the field of influence of one or more further illumination spots. That is to say, gaps must then be produced in the image region and further images of the specimen which close these gaps must subsequently be recorded. Otherwise, a plurality of images of the specimen displaced relative to each other are added up to form an image. This feature also applies to other types of structured illumination, thus for example also to multi-line illumination.

According to a preferred embodiment of the method it is provided to add a quasi-confocal filtering at least into the optical detection path after the colour splitting. The diameter of the confocal diaphragm is preferably 1 to 2 airy units. Below a diameter of 1 airy unit of the confocal diaphragm the signal-to-noise ratio is reduced. A large diameter of the confocal diaphragm (>2 airy units) leads, in the case of thick specimens, to a higher proportion of extra-focal specimen light in the detected signal and has a disadvantageous effect upon the quality of the images.

An embodiment of the method can also involve the method being combined with a multi-spot illumination and with quasi-confocal detection.

The invention also comprises a microscope, in particular for carrying out the method according to the invention, which has: a specimen plane, in which a specimen to be examined can be positioned; at least one light source to emit illuminating light in the direction of the specimen plane; a beam forming unit to produce a structured illumination on the specimen and a detection unit with at least one detection means which consists in particular of a plurality of sub-airy detector elements. In addition the microscope comprises a first scanning means to displace the structured illumination in a specimen plane and/or a second scanning means to displace the specimen light on the detection means and/or a means for the movement of the detection means and/or a displacement unit 45 for displacing the specimen in the specimen plane. Furthermore the light microscope comprises at least one control unit which controls the first scanning means and/or the second scanning means and/or the means for direct movement of the detection means and/or the displacement unit for a movement. It is thereby provided that the control unit controls the first scanning means and/or the second scanning means and/or the means for direct movement of the detection means and/or the displacement unit in such a way that relative movements take place between structured illumination, specimen and detection in such a way that a first relative movement takes place between the structured illumination and the specimen, and a second relative movement takes place between the detection and the specimen, wherein the first relative movement is carried out simultaneously with and preferably counter to the second relative movement.

According to a preferred variant of the invention it is provided that the control unit controls the first scanning means, the second scanning means and/or the means for displacing the detection means and displacement unit in such a way that the specimen remains in the specimen plane during image recording, a movement of the detection and the structured illumination takes place, the image of the detection means, in a specimen plane, carries out a movement constantly counter to the structured illumination in a specimen plane and simultaneous therewith and preferably having equal step size and/or equal speed values.

According to a further preferred variant it is provided that the control unit controls the first scanning means, the second scanning means and/or the means for displacement of the detection means and displacement unit in such a way that the detection means and the image thereof remain in the specimen plane during image recording, a movement of the specimen and the structured illumination takes place, wherein the specimen constantly moves in a specimen plane in the same direction as the structured illumination in a specimen plane. The specimen moves preferably with half the step size and/or half the speed of the structured illumination.

It can alternatively or additionally be provided that the control unit controls the first scanning means, the second scanning means and/or the means for displacement of the detection means and/or the displacement unit in such a way that the structured illumination remains in the specimen plane, a movement of the specimen and the detection takes place, wherein the specimen constantly moves in the same direction as the detection means in a specimen plane. The specimen moves preferably with half the step size and/or half the speed of the image of the detection means in the specimen plane.

It can be provided that the microscope is a wide field microscope and the specimen light does not propagate via the scanning means, via which the illuminating light is deflected.

Finally, the invention also comprises a microscope with a specimen plane, in which a specimen to be examined can be positioned, having at least one light source to emit illuminating light in the direction of the specimen plane, having a beam forming unit to produce a structured illumination on the specimen, a scanning means for displacing the structured illumination on the specimen, a detection unit with at least one detection means consisting of a plurality of sub-airy detector elements, and having at least one control unit which controls the first scanning means and the detection unit. It is provided for the microscope that the specimen remains in the specimen plane during image recording, that the specimen light propagates via the scanning means and subsequently through at least one quasi-confocal diaphragm in order to undergo a dual re-scan through the scanning means upstream of the detection means, and that as a result the image of the detection means, in the specimen plane, carries out a simultaneous movement preferably counter to the structured-illumination in the specimen plane with preferably equal step size and/or speed values.

Further features and advantages of the invention are described below in relation to the attached schematic drawing, in which.

Similar components and those working similarly are generally provided with the same reference symbols in the drawings.

Figure 1:
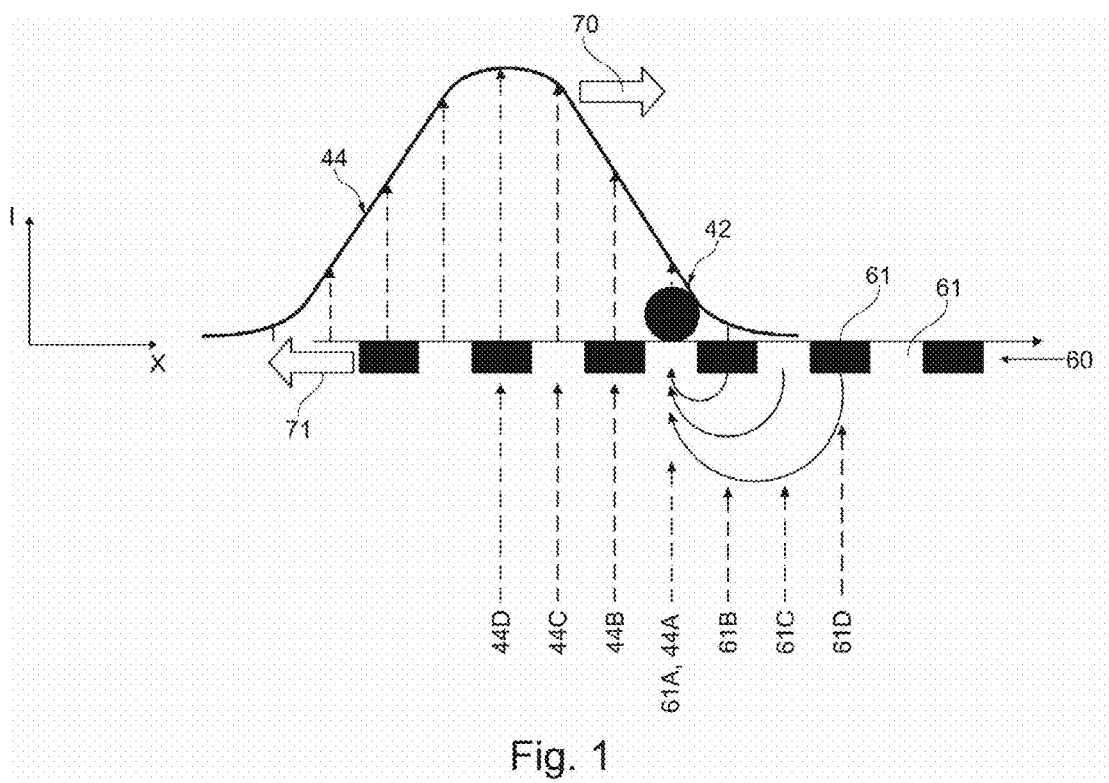
FIG. 1 shows the principle of signal formation, in particular in the accumulation of the signals of the displaced detector elements.

The derivation of the core idea of the invention can be understood by reference to FIG. 1: It is not only the sub-airy detector element 61A—which coincides with the specimen position and the centre of the illumination PSF 44—that contributes to the confocal signal of a fluorescent colour bead 42 assigned to a specimen point or image point, but instead detector elements which lie—as observed from the specimen point—on the side lying opposite the illumination spot 44 also contribute to the signal. As the illumination spot 44 moves, different points in time or positions of the illumination spot 44 are also associated therewith. The term "position" is intended here to mean the centre of the symmetrical illumination spot 44.

The previously described sorting can advantageously be avoided through the invention, wherein such sorting involves the receiving signals of a certain detector element being assigned to different specimen positions in dependence upon the position of the illumination spot.

According to the invention a movement takes place in such a way that the $0^{th}$ detector element is always located during the movement of the illumination spot 44 at the positions of the detector elements 61 which were used thus far in the sorting of the data. In order that this can take place, a counter movement can take place between structured illumination 44 and the whole pixelated detection means 60.

The illumination spot is moved according to an illumination scanning movement 70 over the colour beads or the specimen 42. The detector means 60 is moved counter to this according to a detection scanning movement 71.

Figure 2:
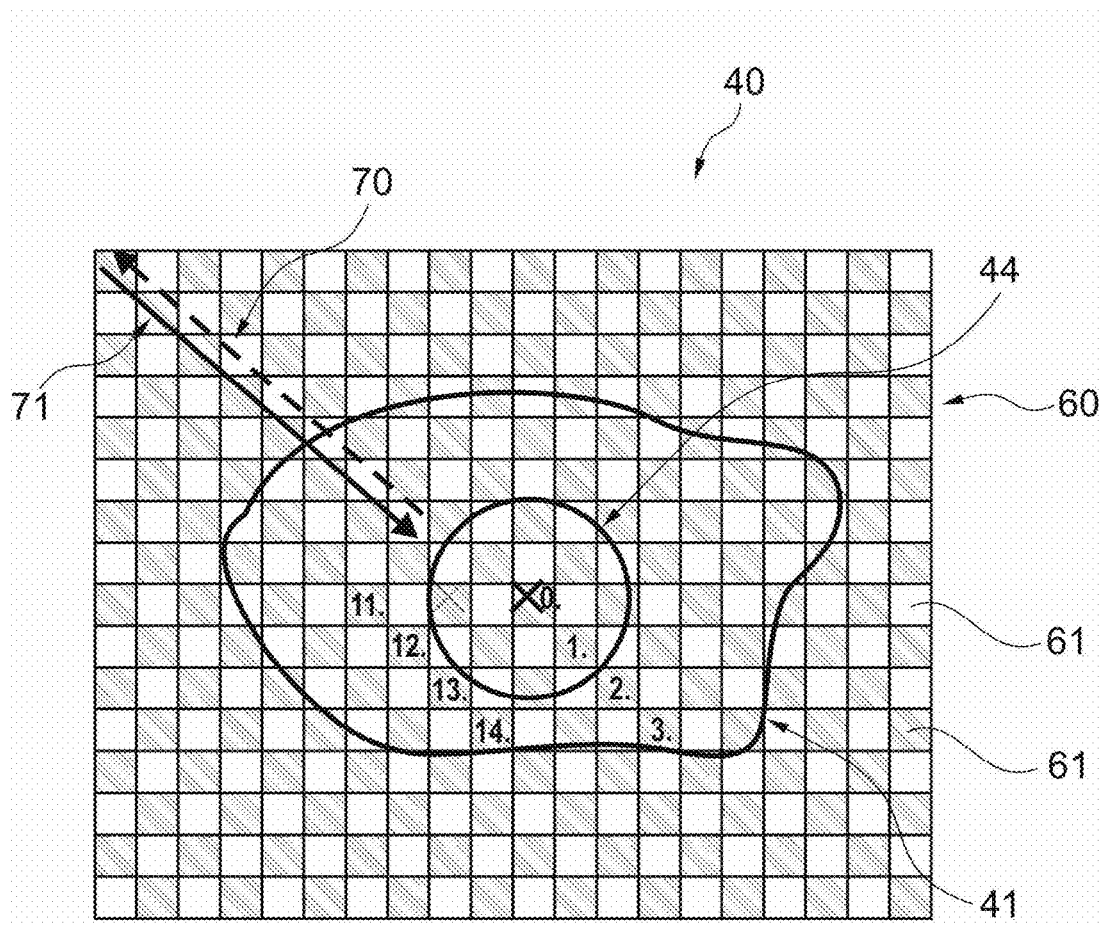
FIG. 2 shows a representation of an illumination spot and the detection means in the specimen plane at a point in time.
Figure 3:
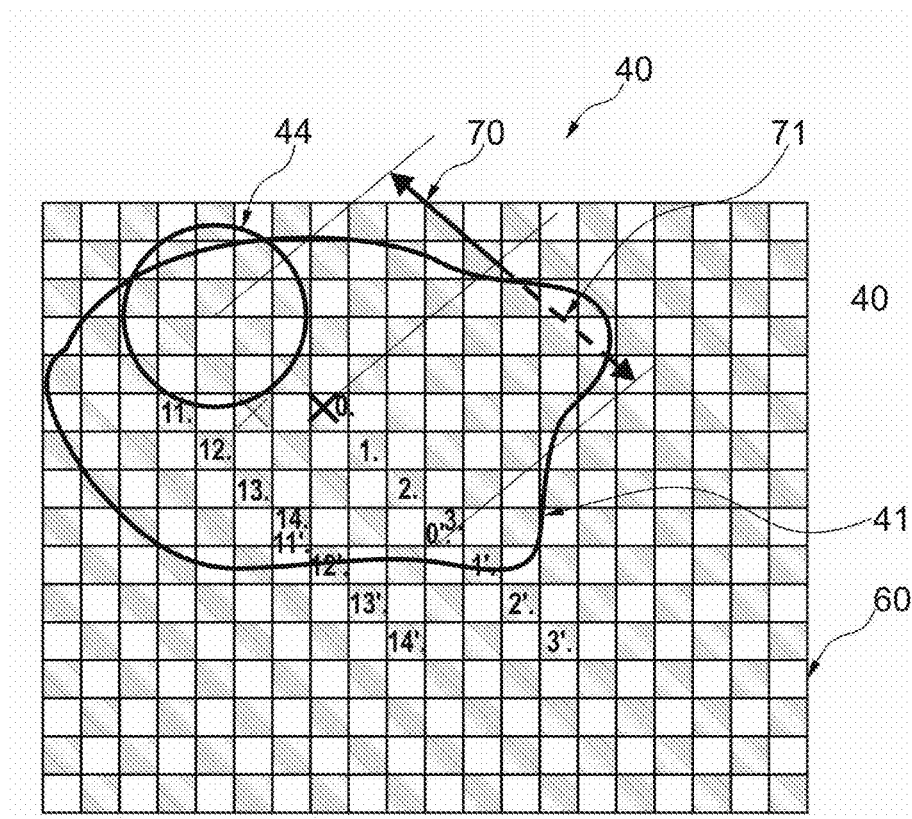
FIG. 3 shows a representation of an illumination spot and the detection means in the specimen plane at another point in time, wherein the illumination spot is displaced in the specimen plane and the detection means is displaced diametrally thereto in the specimen plane.

FIGS. 2 and 3 show two different positions of the illumination spot 44 and the detection means 60 relative to the specimen 41 in the specimen plane 40. The ordinal numbers randomly fixed on the detection means 60 refer to detector elements 61 of the detection means 60 and, as becomes clear by reference to FIGS. 2 and 3, also to corresponding positions of the illumination spot 44.

The two arrows show a first relative movement of the detection means 60 relative to the specimen 41, which is described as a detection scanning movement 71, and a second relative movement, counter thereto, of the illumination spot 44 relative to the specimen 41, which is described as an illumination scanning movement 70.

In both FIGS. 2 and 3, specimen points are highlighted by an X and a dotted X. The two associated detector elements 61 are randomly identified in FIG. 2 as the $0^{th}$ or respectively $11^{th}$ detector element. Upon movement of the illumination spot 44 counter thereto they are moved away from the associated specimen points (X and dotted X) and are each marked in FIG. 3, after the displacement, with an apostrophe. There is still symmetry in such a way that the image point is positioned centrally relative to the illumination spot 44 and to the associated sub-airy detector element 61. In other words, the sub-airy detector element 61 belonging to the specimen point is located lying opposite the illumination point 44 and this applies for each sub-airy detector element 61 belonging to a specimen point.

FIGS. 2 and 3 illustrate that during scanning of an illumination spot 44 over the specimen 41 the detector 60 need not be stopped. A gap-free image of the specimen 41 with improved resolution is produced.

When using the method according to the invention the specimen region of the specimen 41 imaged is half the size, in its x/y extension, of the detection means 60.

Figure 4:
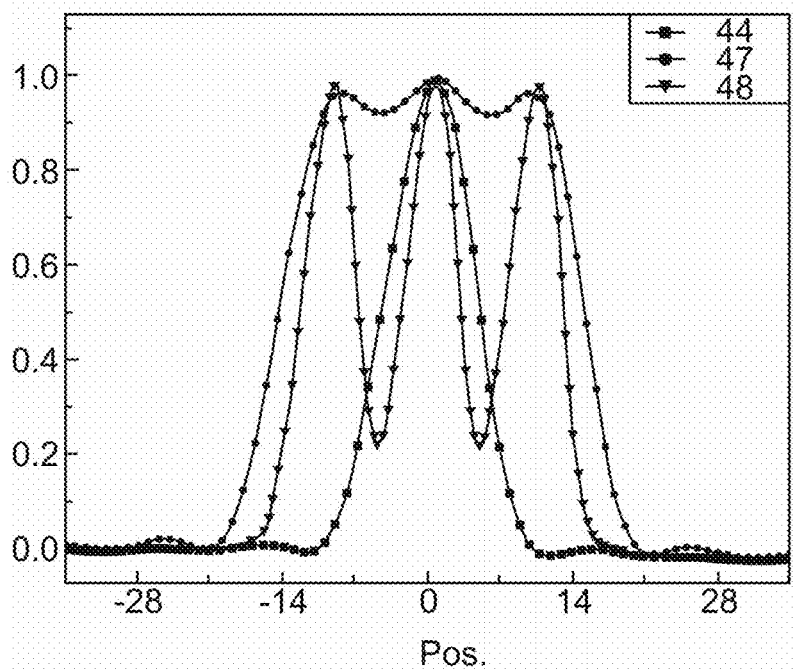
FIG. 4 shows simulated measurement results for a detection means scanning diametrally to the illumination spot in comparison with normal incoherent wide field illumination upon interaction of the illumination spot with three fluorescent sub-airy colour beads arranged one beside the other.

FIG. 4 shows simulation results for the method according to the invention in comparison with incoherent wide field illumination. A light intensity I is shown again a position Pos in the specimen plane. The units are random. In the specimen plane there are three fluorescent colour beads lying one beside the other, at the positions −10, 0 and +10. Firstly the intensity pattern of an illumination spot 44 is indicated. For this purpose, the spatial signal pattern (without noise) after interaction of the illumination spot 44 with the three colour beads is indicated on a detection means which consists of a plurality of detection elements. This signal pattern is indicated as a curve 47 for a conventional incoherent wide field fluorescent microscope and also as a curve 48 for a light microscope according to the invention.

The improvement in the resolution in comparison with incoherent wide field fluorescent microscopy is already clearly visible without mathematical calculation. The resolution which can be achieved in incoherent wide field fluorescent microscopy corresponds approximately to the resolution in laser scanning microscopy if a pinhole diameter of one airy unit is used before the detector.

Figure 5:
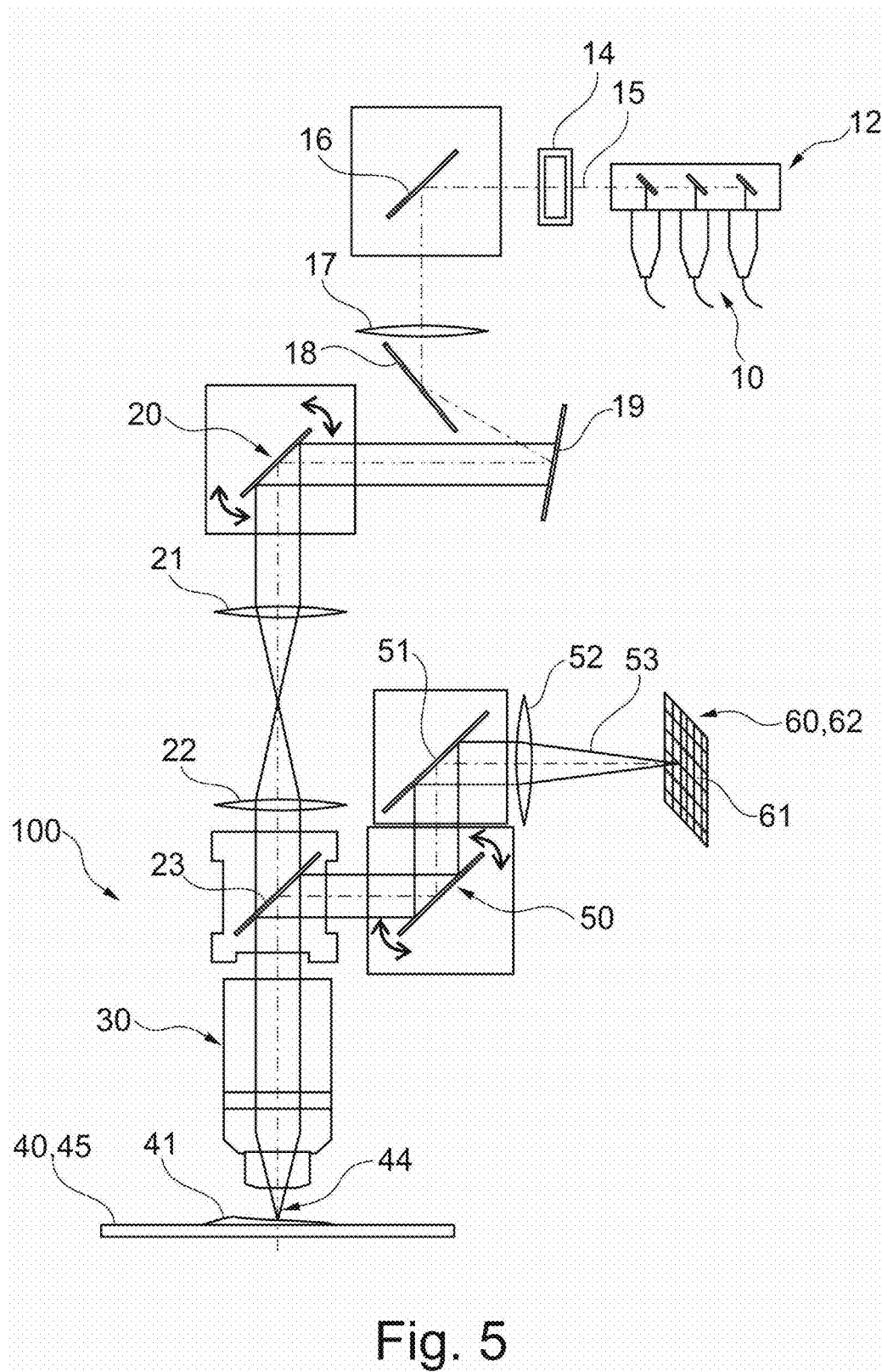
FIG. 5 shows a first embodiment of a light microscope according to the invention.

FIG. 5 shows an embodiment of the light microscope 100 according to the invention and the method according to the invention. Illuminating light 15 coming from a light source 10 propagates via a "mirror staircase" 12, an acousto-optical device 14 and a plurality of optical components 16, 17, 18, 19 to the scanning means 20. This facilitates the movement of the illumination spot 44 over the specimen 41. Optics 21 produce the illumination spot 44 in an intermediate image between the optics 21 and 22. Subsequently the illuminating light 15 enters the objective 30 which then produces the diffraction-limited illumination spot 44 in the specimen plane 40.

Specimen light 53 is produced in the specimen 41 after interaction with the illumination spot. 44. This specimen light 53 is deflected with a colour beam splitter 23 in the direction of a detection means 60. The colour beam splitter 23 can transmit or reflect light depending upon wavelength. After being directed via the scanning means 50 and the mirror 51, the specimen light 53 is imaged through focussing optics 52 on the detection means 60. The optical means for imaging different specimen regions on different detector regions of the detector means thus comprise here the components 30, 23, 51 and 52.

The second scanning means 50 shown in FIG. 5 is required in order to be able to produce the diametral relative movement—required for the method—of the detection means 60 relative to the illumination spot 44 in case of a specimen 41 at rest. That is to say, the detection means 60 is not moved itself here. This embodiment offers the advantage of an achievable higher scanning speed. The scanner technology is an extensively sophisticated technology.

In principle, however, a specimen holder 45 which holds the specimen 44 in the specimen plane 40 can also be adjusted. The specimen 44 can hereby be moved relative to the illuminating light 15 or relative to the detection means 60. By displacing the specimen holder 45 an illumination scanning movement or a detection scanning movement can thus take place. The specimen holder can also be described as a displacement unit 45.

A control unit which carries out the synchronisation between the scanning means 20 for the structured illuminating light 44 and the scanning means 50 for the specimen light 53 is not shown in the image. The control unit has the role of ensuring that the two scanning means 20 and 50 bring about diametral relative movements in the specimen 41. The control unit also controls (not shown) the integration time or respectively the reading of the detection means 60. In this way the resolution increase according to the invention is facilitated.

Figure 6:
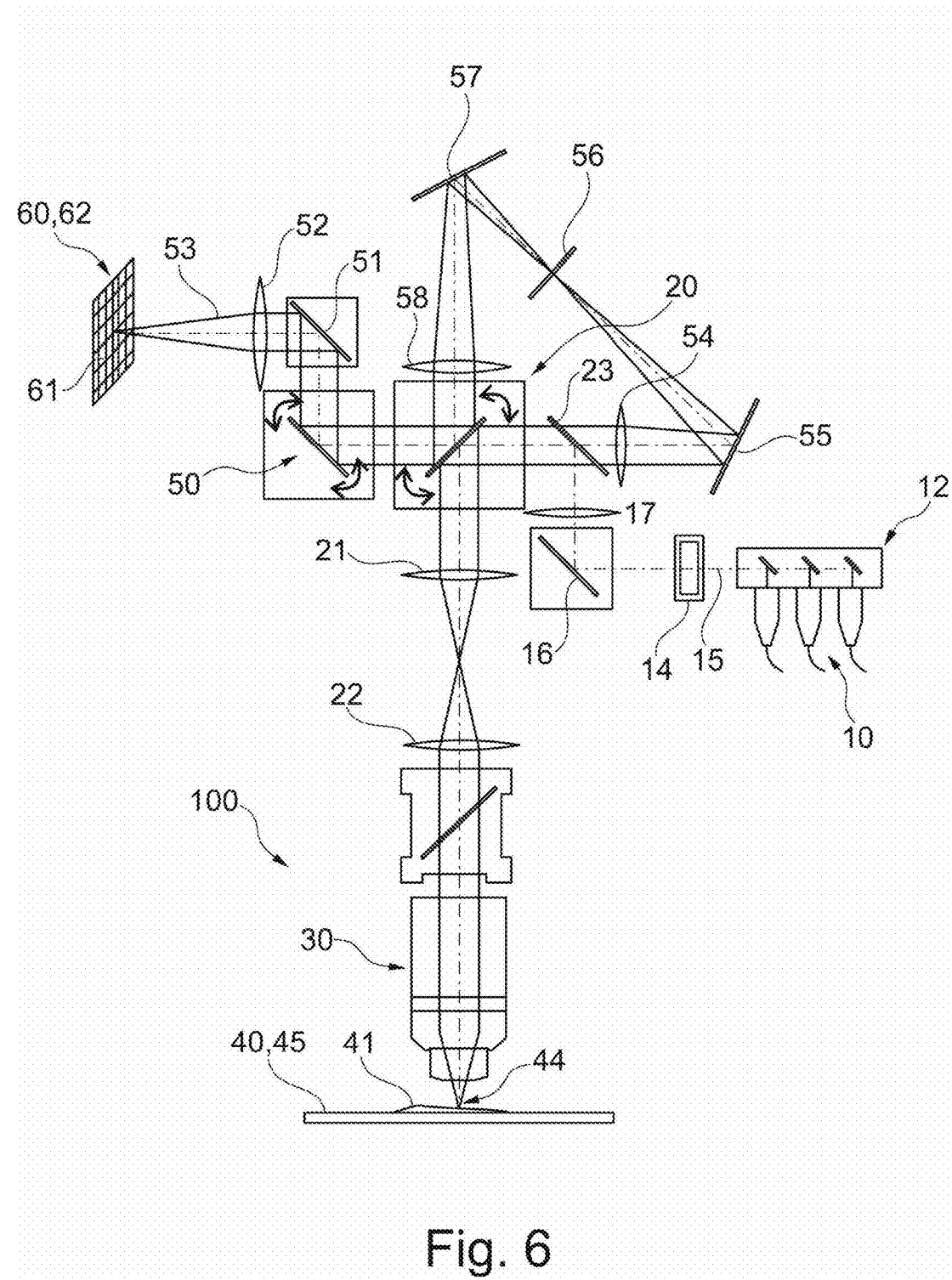
FIG. 6 shows a second embodiment of a light microscope according to the invention with quasi-focal filtering and with a re-scan in the optical detection path and FIG. 7 shows a third embodiment of a light microscope according to the invention with quasi-confocal filtering and with double re-scan angle in the optical detection path.

FIG. 6 shows a further embodiment of the light microscope 100 according to the invention and the method according to the invention. Unlike in FIG. 5, the specimen light 53 runs via the first scanning means 20 in the direction of the detection plane 62, in which the detection means 60 is located.

The specimen light 53 can initially reach a front side of a scanning mirror of the scanning means 20, via which the illuminating light is also deflected. After the scanning means 20 the specimen light 53 passes the colour beam splitter 23 and is focussed by optics 54 and via a mirror 55 in an image plane. In this image plane there is a confocal diaphragm 56. In order to carry out the method the diaphragm 56 is adjusted to a diameter ≥1 airy unit. A smaller diaphragm diameter is not required to obtain an increased resolution and would reduce the signal-to-noise ratio. In the case of a diaphragm diameter of 1-2 airy units, extra-focal light is already efficiently suppressed.

After the specimen light 53 has passed the diaphragm 56 it is forwarded via a mirror 57 and collimated by optics 58. The specimen light 53 can be conveyed to a rear side of the scanning mirror of the scanning means 20 and from there to the scanning means 50. The specimen light 53 is then guided by the scanning means 50 in the direction of the detection means 60 and moved via this synchronously with the movement of the illumination spot 44 in the specimen plane 40. An image of the specimen 41 is thus produced on the detection means 60.

The second scanning means 50 following in the specimen light optical path brings about the diametral relative movement of the detection means 60 relative to the illumination spot 44 for a specimen 41 at rest. The scanning means 50 causes a displacement of the optical axis relative to the detection means 60, which cannot be brought about by the scanning means 20 in this embodiment.

The displacement of the optical axis relative to the detection means 60 brings about the relative displacement between the specimen 41 and the detection means 60.

The two scanning means 20 and 50 must be appropriately synchronised in their movement by a control unit. The control unit required for this purpose or the required electronic means are not shown.

The optical path of the specimen light 53 from the optics 58 to the detection means 60 can—as shown in FIG. 6—take place via two scanning means 20 and 50. Alternatively it is possible to realise the movement of the specimen light 53 via an individual scanning means which produces a double sized offset of the specimen light 53 on the detection means 60. In this way the diametral displacement according to the invention between the illuminating light 15 and specimen light 53 on the detection means 60 is realised relative to the specimen 41.

Figure 7:
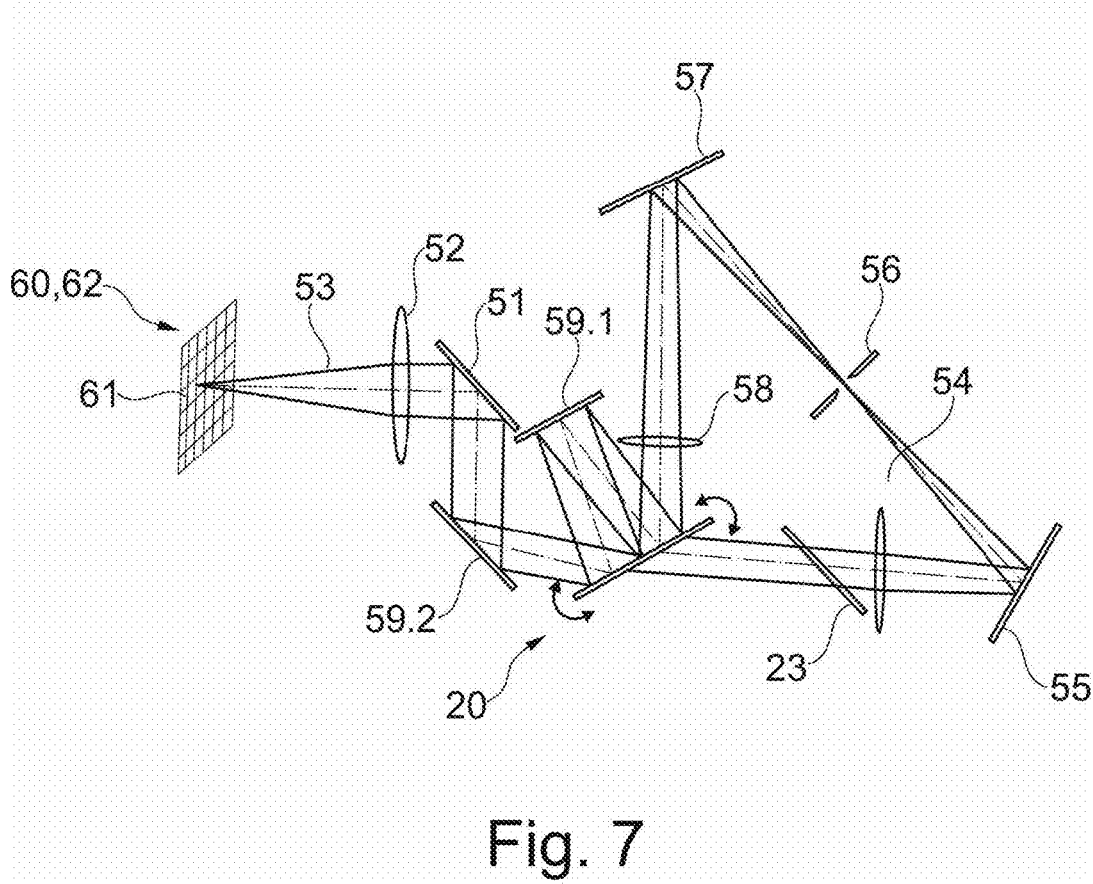

FIG. 7 shows the optical detection path of an embodiment of the light microscope according to the invention. In contrast with FIG. 6 there is no second scanning means 50 in the path of the specimen light 53 to the detection means 60. In addition, in FIG. 7, the specimen light 53 is guided with the aid of a mirror 59.1 twice via the scanning means 20 and via a mirror 59.2 towards the detection means 60. The angle change of the optical axis introduced through the scanning means 20 is not thereby compensated by the second interaction with the scanning means 20 through the reflection on, e.g., the rear side, but instead overcompensated. The optical axis is not therefore static on the detection means 60. Instead, it moves on the detection means 60 by half the stretch, by which the specimen light 53 produced by the illumination spot 44 moves. The previously mentioned relative movement—necessary for the method—between the specimen 41, structured illumination 44 and detection means 60 is thus achieved.

It can advantageously be ensured with the light microscope according to the invention and the method according to the invention that a specimen image with particularly high resolution can be recorded rapidly and with comparatively simple means. For increased resolution, detector elements can be used which are smaller than an airy disk, that is to say smaller than a region on the detection means, on which a specimen point is imaged. A plurality of adjacent detector elements hereby receives light from the same specimen point. In order that such adjacent detector elements can still differentiate between specimen points lying closely one beside the other, according to the invention an illumination scanning movement and a detection scanning movement are carried out simultaneously. The directions thereof are thereby counter to each other.

LIST OF REFERENCE SYMBOLS

10 Light source
12 Mirror staircase with partially permeable mirrors/colour beam splitters
14 Acousto-optic tunable filter (AOTF)
15 Illuminating light
16, 18, 19 Mirror
17 Collimation optics
20 Scanning means, deflection means, scanner
21, 22 Optics
23 Colour beam splitter, beam splitter
30 Objective
40 Specimen plane
41 Specimen
42 Fluorescent sub-airy colour bead
X Marked selected specimen points
44 Illumination spot
44A-44D Positions of the respective mid-point of illumination spots in the specimen plane
45 Specimen displacement unit, specimen holder
47 Detection signal with conventional wide field illumination
48 Detection signal with a light microscope according to the invention
50 Scanning means, deflection means, scanner
51, 55, 57 Mirror
52 Focussing optics
53 Specimen light
54, 58 Optics
56 Pinhole, confocal diaphragm, spatial filter
59.1, 59.2 Mirror
60 Detection means comprising a plurality of sub-airy detector elements (e.g. 2D chip camera)
61, 61A-61D Detector elements, detector pixels
62 Detection plane
70 Illumination scanning movement
71 Detection scanning movement
100 Light microscope

The invention claimed is:
1. A light microscope, comprising
a specimen plane, in which a specimen to be examined can be positioned,
a light source to emit illuminating light,
optical imaging means to convey the illuminating light into the specimen plane,
a first scanning means arranged to produce an illumination scanning movement of the illuminating light relative to the specimen,
the illumination scanning movement being defined in the specimen plane,
wherein the first scanning means is: configured to move an optical path of the illuminating light to the specimen or configured to move the specimen relative to the optical path of the illumination light, or configured to move the light source relative to the specimen,
a detector means to detect specimen light coming from the specimen, the detector means comprising several detector elements, wherein adjacent detector elements are at a distance from each other which is smaller than an airy disk produced by a point in the specimen plane on the detector means,
electronic means to determine an image of the specimen on the basis of the specimen light detected by the detector means,
wherein
the light microscope further comprises a second scanning means, arranged to produce a detection scanning movement of specimen light coming from the specimen to receiving regions of the detector elements of the detector means in the specimen plane, to adjust which specimen region is imaged on a specific detector element, the detection scanning movement being defined in the specimen plane as a movement of a receiving region of one of the detector elements relative to the specimen,
wherein the second scanning means is: configured to move an optical path of the specimen light, or configured to move the detector means relative to the optical path of the specimen light, or configured to move the specimen if the first scanning means is not configured to move the specimen, the illumination scanning movement and the detection scanning movement both being defined in the specimen plane, and the electronic means is adapted to control the first and the second scanning means in dependence upon each other and in such a way that a momentary direction of the detection scanning movement is parallel but oppositely directed to a momentary direction of the illumination scanning movement.

2. The light microscope of claim 1,
wherein
the first scanning means is adapted to adjust a beam deflection of the illuminating light to produce the illumination scanning movement.

3. The light microscope of claim 1,
wherein
a specimen holder is configured to be movable relative to an optical path of the illuminating light with the first scanning means to produce the illumination scanning movement.

4. The light microscope of claim 1,
wherein
a beam deflection of the specimen light can be adjusted with the second scanning means to move an image of a specimen region over the detector means.

5. The light microscope of claim 1,
wherein
the first and the second scanning means are formed with a joint scanning means, the joint scanning means has a scanning mirror, wherein illuminating light can be conveyed to a front side of the scanning mirror, and for producing opposite directions between the illumination scanning movement and the detection scanning movement, a beam guiding means is provided which can guide the specimen light to a rear side of the scanning mirror.

6. The light microscope of claim 5, wherein with the beam guiding means, specimen light can be conveyed initially to the front side of the scanning mirror and from there to the rear side of the scanning mirror, and specimen light reflected by the rear side of the scanning mirror can once again be conveyed to the rear side of the scanning mirror to produce counter directions between the illumination scanning movement and the detection scanning movement.

7. The light microscope of claim 1, wherein the second scanning means is adapted to move a specimen holder in order to move an image of a certain specimen region over the detector means.

8. The light microscope of claim 1, wherein the second scanning means is adapted to move the detector means in order to move an image of a certain specimen region over the detector means.

9. The light microscope of claim 1, wherein the electronic means is adapted to carry out the illumination scanning movement and the detection scanning movement with at least one of a coinciding step size or a coinciding speed value, with respect to the specimen plane.

10. The light microscope of claim 1, wherein an image of a specimen can be produced with the optical means on a detection surface of the detector means, wherein the dimensions of the image are given through the magnification of the optical means, and a length and a width of the detection surface are at least double the size of the dimensions of the image.

11. The light microscope of claim 1, wherein the microscope is a wide field microscope.

12. The light microscope of claim 1, wherein a diaphragm for quasi-confocal filtering is present in an optical detection path.

13. A microscopy method for examining a specimen which is positioned in a specimen plane of a microscope, wherein illuminating light is conveyed into the specimen plane, wherein an optical path of the illuminating light and the specimen are moved relative to each other to produce an illumination scanning movement of the illuminating light relative to the specimen, wherein the illumination scanning movement is defined in the specimen plane and is produced with first scanning means;

wherein the first scanning means: moves an optical path of the illuminating light to the specimen or moves the specimen relative to the optical path of the illumination light, or moves the light source relative to the specimen, wherein specimen light coming from the specimen is detected with a detector means and an image of the specimen is determined with electronic means on the basis of the detected specimen light, the detector means comprising several detector elements, wherein adjacent detector elements are at a distance from each other which is smaller than an airy disk produced by a point in the specimen plane on the detector means, wherein a detection scanning movement of a receiving region of a detector element is produced in the specimen plane relative to the specimen by adjusting which specimen region is imaged on a determined detector element, wherein the detection scanning movement is produced with a second scanning means which: moves an optical path of the specimen light, or moves the detector means relative to the optical path of the specimen light, or moves the specimen if the first scanning means is not configured to move the specimen, the illumination scanning movement and the detection scanning movement both being defined in the specimen plane, and the illumination scanning movement and the detection scanning movement are controlled in dependence upon each other and in such a way that a momentary direction of the detection scanning movement and a momentary direction of the illumination scanning movement are parallel but oppositely directed to each other.

14. The microscopy method of claim 13, wherein illumination scanning movements and detection scanning movements are carried out during an integration time of detector elements of the detector means.

15. The microscopy method of claim 13, wherein the detector elements integrate received specimen light signals without pause to record a specimen image.

* * * * *